United States Patent
Zhao

(10) Patent No.: US 11,062,480 B2
(45) Date of Patent: Jul. 13, 2021

(54) METHOD AND APPARATUS FOR PROCESSING IMAGE

(71) Applicant: BOE TECHNOLOGY GROUP CO., LTD., Beijing (CN)

(72) Inventor: Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 128 days.

(21) Appl. No.: 16/464,424

(22) PCT Filed: Dec. 14, 2018

(86) PCT No.: PCT/CN2018/121170
§ 371 (c)(1),
(2) Date: May 28, 2019

(87) PCT Pub. No.: WO2019/134491
PCT Pub. Date: Jul. 11, 2019

(65) Prior Publication Data
US 2020/0320743 A1    Oct. 8, 2020

(30) Foreign Application Priority Data

Jan. 2, 2018    (CN) .......................... 201810002968.6

(51) Int. Cl.
*G06K 9/46*       (2006.01)
*G06T 7/90*       (2017.01)
(Continued)

(52) U.S. Cl.
CPC ............ *G06T 7/90* (2017.01); *G06K 9/00362* (2013.01); *G06K 9/4652* (2013.01); *G06T 7/11* (2017.01);
(Continued)

(58) Field of Classification Search
CPC .................................... G06T 7/90; G06T 7/11
See application file for complete search history.

(56) References Cited

U.S. PATENT DOCUMENTS

| 8,781,221 B2* | 7/2014 | Ding | G06K 9/00228 |
| | | | 382/164 |
| 2012/0068917 A1* | 3/2012 | Huang | G06K 9/00355 |
| | | | 345/156 |

(Continued)

FOREIGN PATENT DOCUMENTS

| CN | 1645904 A   | 7/2005 |
| CN | 103077541 A | 5/2013 |
| CN | 108230407 A | 6/2018 |

OTHER PUBLICATIONS

Office Action dated Nov. 29, 2019, issued in counterpart CN Application No. 201810002968.6, with English translation (13 pages).

(Continued)

*Primary Examiner* — Tuan H Nguyen
(74) *Attorney, Agent, or Firm* — Westerman, Hattori, Daniels & Adrian, LLP

(57) ABSTRACT

A method for processing an image may include: collecting an ambient light spectrum while capturing an image (10); determining RGB tristimulus values corresponding to ambient environment of the captured image based on the collected ambient light spectrum and a color filter absorption curve (11); determining skin color coordinates based on the collected ambient light spectrum and a spectral absorption curve of a skin color model (12); and determining RGB values in the skin color model based on the RGB tristimulus values and the skin color coordinates (13).

13 Claims, 7 Drawing Sheets

(51) Int. Cl.
  *G06T 7/11* (2017.01)
  *G06K 9/00* (2006.01)
  *H04N 5/232* (2006.01)
(52) U.S. Cl.
  CPC ............... *H04N 5/23229* (2013.01); *G06T 2207/10024* (2013.01)

(56) References Cited

U.S. PATENT DOCUMENTS

2012/0069168 A1  3/2012  Huang et al.
2016/0085312 A1  3/2016  Shieh et al.

OTHER PUBLICATIONS

International Search Report dated Mar. 13, 2019, issued in counterpart Application No. PCT/CN2018/121170 (10 pages).
Office Action dated Jun. 3, 2020, issued in counterpart CN application No. 201810002968.6, with English translation. (21 pages).

* cited by examiner

METHOD AND APPARATUS FOR PROCESSING IMAGE

CROSS-REFERENCE TO RELATED APPLICATIONS

This application claims benefit of the filing date of Chinese Patent Application No. 201810002968.6 filed on Jan. 2, 2018, the disclosure of which is hereby incorporated in its entirety by reference.

TECHNICAL FIELD

This disclosure relates to a human-computer interaction technology, and in particular, to a method and an apparatus for processing an image.

BACKGROUND

With the maturing of image processing technology, it has been widely applied to the field of gesture interaction and face recognition. During the application of this technology, skin color model is generally used to extract characters.

The skin color model generally includes color models such as Red Green Blue (RGB) model, Hue Saturation Value (HSV) model, and Lab model. The RGB model is a model of three primary colors: red, yellow, and blue. It is the foundation for imaging equipment, displaying equipment, and the like. The HSV color model is a model of hue, saturation, and value, which reflects the way humans observe the color. The Lab color model is a model composed of brightness and two color channels, a and b. The L component is used to represent the brightness of a pixel, indicating from pure black to pure white; the "a" represents the range from red to green; and the "b" represents the range from yellow to blue. The Lab color model uses digital values to describe people's visual perception.

In the prior art, image processing using the skin color model generally uses an RGB image directly outputted from a camera for a skin color segmentation process. However, the RGB image directly outputted from a camera is an RGB image being subjected to CCD color filter, exposure control, and white balance, and is prone to cause error in the recognition process. Thus, the present image processing techniques have problems such as being prone to error and low accuracy.

BRIEF SUMMARY

Accordingly, one example of the present disclosure is a method for processing an image. The method may include collecting an ambient light spectrum while capturing an image, determining RGB tristimulus values corresponding to ambient environment of the captured image based on the collected ambient light spectrum and a color filter absorption curve, determining skin color coordinates based on the collected ambient light spectrum and a spectral absorption curve of a skin color model, and determining RGB values in the skin color model based on the RGB tristimulus values and the skin color coordinates.

Optionally, the method further includes performing a skin color segmentation process on the captured image using the skin color model.

Optionally, collecting the ambient light spectrum while capturing the image by the camera comprises collecting the ambient light spectrum in a range of a wavelength of 380 nm to 780 nm with an interval of 1 nm or 5 nm.

Optionally, determining the skin color coordinates based on the collected ambient light spectrum and the spectral absorption curve of the skin color model comprises determining tristimulus values based on the collected ambient light spectrum and the spectral absorption curve of the preset skin color model and determining the skin color coordinates based on the tristimulus values.

Optionally, the method further includes turning off white balance function of the camera before collecting the ambient light spectrum while capturing the image by the camera or performing white balance inverse transformation on the RGB values in the skin color model after the RGB values in the skin color model are determined based on the RGB tristimulus values and the skin color coordinates and before the skin color segmentation process is performed on the captured image using the skin color model.

Optionally, performing the skin color segmentation process on the captured image using the skin color model comprises converting the skin color model into a color luminance separation color space and performing the skin color segmentation process on the captured image based on the color luminance separation color space.

Optionally, performing the skin color segmentation process on the captured image using the skin color model comprises adjusting a range of saturation of the color luminance separation color space based on exposure time of the collected image Optionally, another example of the present disclosure is an apparatus for processing an image. The apparatus includes at least one processing unit and at least one storage unit. the storage unit is configured to store a program code, and the program code is configured to be executed by the processing unit to perform steps of collecting an ambient light spectrum while capturing an image by a camera; determining RGB tristimulus values corresponding to ambient environment of the captured image based on the collected ambient light spectrum and a color filter absorption curve; determining skin color coordinates based on the collected ambient light spectrum and a spectral absorption curve of a skin color model; determining RGB values in the skin color model based on the RGB tristimulus values and the skin color coordinates; and performing a skin color segmentation process on the captured image using the skin color model.

Optionally, the processing unit is configured to determine RGB tristimulus values corresponding to ambient environment of the captured image based on the collected ambient light spectrum and the color filter absorption curve.

Optionally, the processing unit is configured to determine tristimulus values based on the collected ambient light spectrum and the spectral absorption curve of the skin color model and determine the skin color coordinates based on the tristimulus values.

Optionally, the processing unit is configured to turn off white balance function of the camera before collecting the ambient light spectrum while capturing the image by the camera; or to perform white balance inverse transformation on the RGB values in the skin color model after the RGB values in the skin color model are determined based on the RGB tristimulus values and the skin color coordinates and before the skin color segmentation process is performed on the captured image using the skin color model.

Optionally, the processing unit is configured to convert the skin color model into a color luminance separation color space; and to perform the skin color segmentation process on the captured image based on the color luminance separation color space.

One example of the present disclosure includes an apparatus for processing an image. The apparatus for processing an image may include an acquisition module, a determination module, and a processing module. The acquisition module is configured to collect an ambient light spectrum while capturing an image by a camera; the determination module is configured to determine RGB tristimulus values corresponding to the ambient environment of the captured image based on the collected ambient light spectrum and a color filter absorption curve, to determine the skin color coordinates based on the collected ambient light spectrum and a spectral absorption curve of the skin color model, and to determine RGB values in the skin color model based on the RGB data color coordinates and the skin color coordinates; and the processing module is configured to perform a skin color segmentation process on the captured image using the skin color model.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
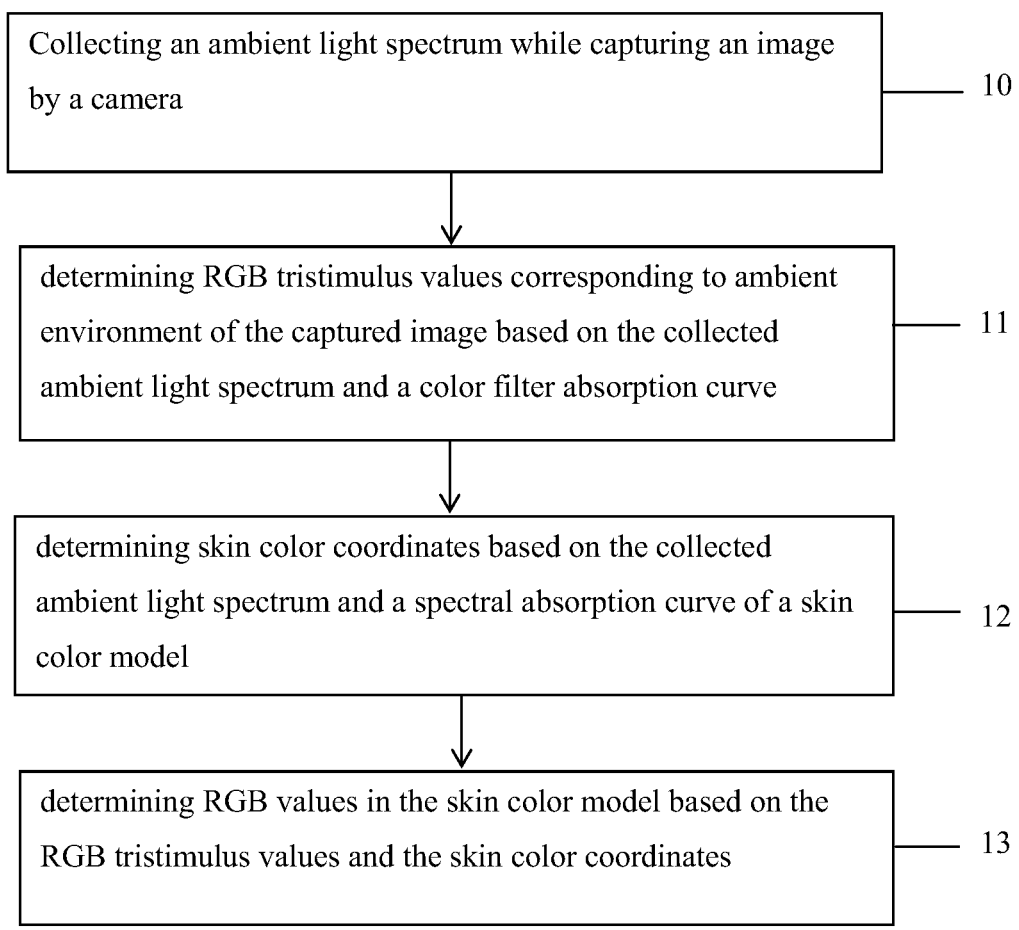
FIG. 1 is a diagram of a method for processing an image according to an embodiment of the present disclosure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-7. When referring to the figures, like structures and elements shown throughout are indicated with like reference numerals.

An embodiment of the present disclosure provides a method for processing an image. The method includes the following steps, as shown in FIG. 1.

In step 10, an ambient light spectrum is collected while an image is captured by a camera.

In step 11, based on the captured ambient light spectrum and a preset color filter absorption curve, RGB tristimulus values corresponding to the ambient environment of the captured image are determined.

In step 12, based on the collected ambient light spectrum and an absorption curve of a preset skin color model, skin color coordinates are determined.

In step 13, based on the RGB tristimulus values corresponding to the ambient environment of the captured image and the skin color coordinates, RGB values in the skin color model are determined. Then, a skin color segmentation process using the skin color model is performed on the captured image.

In this embodiment of the present disclosure, an ambient light spectrum is collected while an image is captured, and RGB tristimulus values corresponding to ambient environment of the captured image are determined based on the collected ambient light spectrum and a preset color filter absorption curve. The collected ambient light spectrum and an absorption curve of a preset skin color model are also used to determine the skin color coordinates. Finally, the RGB values in the skin color model are determined based on the RGB tristimulus values and the skin color coordinates corresponding to the ambient environment of the captured image. In this embodiment of the present disclosure, the current ambient light spectrum is also collected while the image is captured, and the collected ambient light spectrum is added to the calculation of the RGB values of the skin color model so that the RGB values of the skin color model are determined based on the current ambient environment of the captured image. As such, the RGB values of the skin color model are more similar to those of the original image, thereby reducing probability of errors in the recognition process.

In one embodiment, an ambient light spectrum is collected while an image is captured by a camera. The camera includes a spectral detection device for collecting the ambient light spectrum. The ambient light spectrum includes seven light colors of red, orange, yellow, green, cyan, blue and violet, and each of the light colors has a different wavelength. For example, the wavelength of the red light is 630 nm to 780 nm and the wavelength of the orange light is 600 nm~630 nm.

Because the visible light to the human eye is between ultraviolet light and infrared light, and has a wavelength of about 380 nm to 780 nm, the ambient light spectrum in one embodiment of the present disclosure is collected in the range of 380 nm to 780 nm with an interval of 1 nm or 5 nm.

Figure 2:
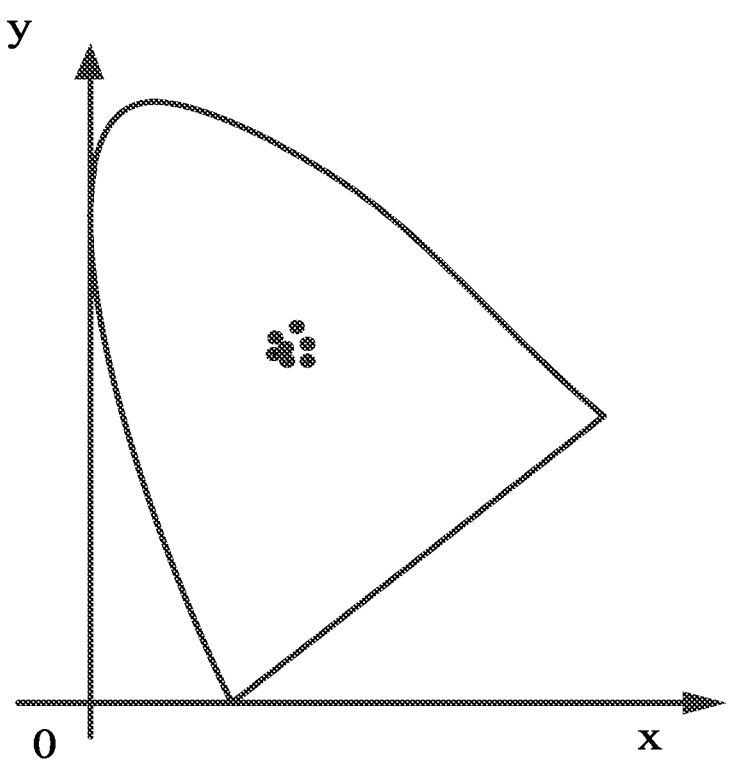
FIG. 2 is a diagram of a product of an ambient light spectrum dot multiplying a preset color filter absorption curve according to an embodiment of the present disclosure.

Correspondingly, the collected ambient light spectrum dot multiplies a preset color filter absorption curve to determine the RGB tristimulus values corresponding to the ambient environment of the captured image. The preset color filter absorption curve has three color curves. Therefore, three coordinates are obtained by dot multiplying the collected ambient light spectrum by the preset color filter absorption curve. As shown in FIG. 2, the polygon area represents the range of the collected ambient light spectrum. The abscissa indicates the wavelength of the visible spectrum and the ordinate indicates the relative values of the primary colors X, Y and Z.

The RGB tristimulus values can be determined by the following formulas:

$$\begin{cases} X_R = K \int_{380}^{780} \phi(\lambda)\bar{x}(\lambda)R(\lambda)d(\lambda) \\ Y_R = K \int_{380}^{780} \phi(\lambda)\bar{y}(\lambda)R(\lambda)d(\lambda) \\ Z_R = K \int_{380}^{780} \phi(\lambda)\bar{z}(\lambda)R(\lambda)d(\lambda) \end{cases}$$

$$\begin{cases} X_G = K \int_{380}^{780} \phi(\lambda)\bar{x}(\lambda)G(\lambda)d(\lambda) \\ Y_G = K \int_{380}^{780} \phi(\lambda)\bar{y}(\lambda)G(\lambda)d(\lambda) \\ Z_G = K \int_{380}^{780} \phi(\lambda)\bar{z}(\lambda)G(\lambda)d(\lambda) \end{cases}$$

$$\begin{cases} X_B = K \int_{380}^{780} \phi(\lambda)\bar{x}(\lambda)B(\lambda)d(\lambda) \\ Y_B = K \int_{380}^{780} \phi(\lambda)\bar{y}(\lambda)B(\lambda)d(\lambda) \\ Z_B = K \int_{380}^{780} \phi(\lambda)\bar{z}(\lambda)B(\lambda)d(\lambda) \end{cases}$$

Wherein K is a constant, $\bar{x}(\lambda)$, $\bar{y}(\lambda)$, and $\bar{z}(\lambda)$ are CIE2° standard observer color matching functions, $\phi(\lambda)$ represents an ambient light spectrum, $R(\lambda)$, $G(\lambda)$, $B(\lambda)$ are color filter absorption curve transmittance; The color filter absorption curve may be an absorption curve of a Complementary Metal Oxide Semiconductor (CMOS) and/or a Charge-coupled Device (CCD) color filter, which need to be preset in the algorithm module.

The tristimulus values are representative of degrees of stimulation of three primary colors of a certain color perception to the human retina. X represents the amount of stimulation of the red primary color, Y represents the amount of stimulation of the green primary color, and Z represents the amount of stimulation of the blue primary color.

Figure 3:
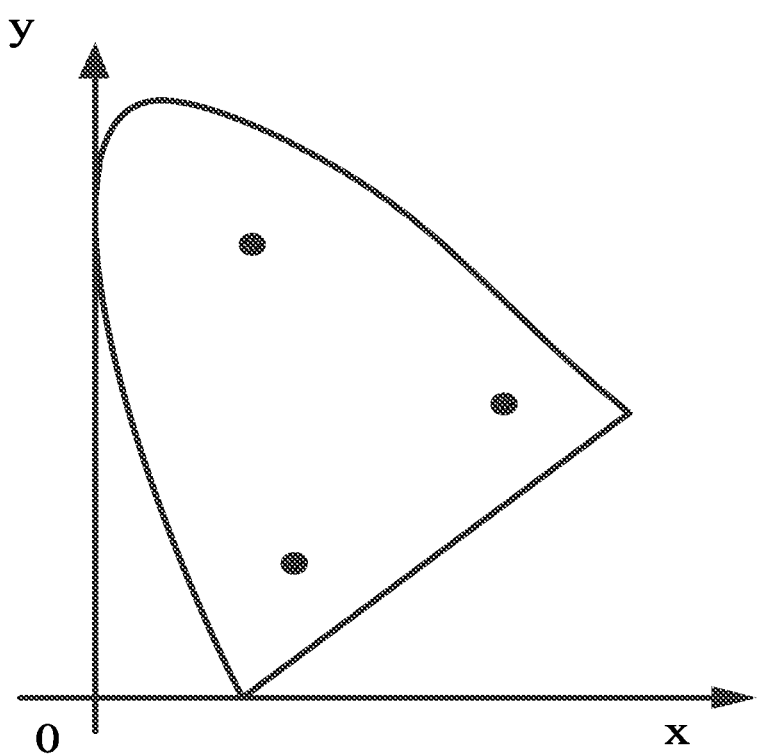
FIG. 3 is a diagram of a product of an ambient light spectrum dot multiplying a spectral absorption curve of a preset skin color model according to an embodiment of the present disclosure.

Correspondingly, the collected ambient light spectrum is dot multiplied by a spectral absorption curve of a preset skin color model to calculate tristimulus values. The spectral absorption curve of the preset skin color model has a plurality of types of curves. Therefore, the collected spectral absorption curve of the preset skin color model dot multiplies the ambient light spectrum to obtain a dot set composed of a plurality of coordinate points, as shown in FIG. 3. The polygon area represents the range of the collected ambient light spectrum. The abscissa represents the wavelength of the visible spectrum and the ordinate represents the relative values of the primary colors X, Y and Z.

The tristimulus values can be determined by the following formulas:

$$\begin{cases} X_A = K \int_{380}^{780} \phi(\lambda)\bar{x}(\lambda)A(\lambda)d(\lambda) \\ Y_A = K \int_{380}^{780} \phi(\lambda)\bar{y}(\lambda)A(\lambda)d(\lambda) \\ Z_A = K \int_{380}^{780} \phi(\lambda)\bar{z}(\lambda)A(\lambda)d(\lambda) \end{cases}$$

Wherein k is a constant, $\bar{x}(\lambda)$, $\bar{y}(\lambda)$, and $\bar{z}(\lambda)$ are CIE2° (Commission Internationale de L'Eclairage) standard observer color matching function, $\phi(\lambda)$ represents an ambient light spectrum, $A(\lambda)$ represents an spectral absorption curve of a skin color model. The spectral absorption curve of the skin color model needs to be preset in the algorithm module in advance.

After the tristimulus values are obtained, the skin color coordinates corresponding to the ambient environment at the time that the image is captured are determined based on the tristimulus values and the RGB tristimulus values corresponding to the ambient environment of the captured image. The skin color coordinates can be determined by the following formulas:

$$\begin{cases} x_A = \dfrac{X_A}{X_A + Y_A + Z_A} \\ y_A = \dfrac{y_A}{X_A + Y_A + Z_A} \\ z_A = \dfrac{z_A}{X_A + Y_A + Z_A} \end{cases}$$

Wherein x, y, and z are RGB color coordinates under the CIE1931 standard specification. In general, a color can be represented by (x, y), and z (z=1−x−y) is not written out.

The order of determining the RGB tristimulus values and the skin color coordinates in the embodiments of the present disclosure is not limited. In one embodiment, the RGB tristimulus values may be determined first and then, the skin color coordinates are determined. In another embodiment, the skin color coordinates may be determined first and then, the RGB tristimulus values are determined.

Correspondingly, the RGB values in the skin color model can be determined based on the obtained RGB tristimulus values and the skin color coordinates. The RGB values in the skin color model can be determined by the following formula:

$$\begin{cases} r^*X_R + g^*X_G + b^*X_B = X_{skin} \\ r^*Y_R + g^*Y_G + b^*Y_B = Y_{skin} \\ r^*Z_R + g^*Z_G + b^*Z_B = Z_{skin} \end{cases}$$

wherein, $(X_R, Y_R, Z_R)$, $(X_G, Y_G, Z_G)$, $(X_B, Y_B, Z_B)$ are the RGB tristimulus values corresponding to the captured image obtained by the above method. $(X_{skin}, Y_{skin}, Z_{skin})$ are the skin color coordinates obtained by the above method.

It should be noted here that the values of (r, g, b) obtained by the above formula are the gamma values of the display, and if one wants to get the final RGB values, one also needs to consult the gamma transmittance table of the display.

When the image is being captured, the camera may perform a white balance process on the image according to the situation at that time.

There are three electronic coupling elements inside the camera, and they are sensitive to blue, green, red lights respectively. The electronic magnification of the three photosensitive circuits is initially preset to be the same, that is, 1:1:1. The white balance adjustment is to change this ratio based on the scene to be adjusted. For example, if the proportion of the blue, green and red light of the scene to be adjusted is 2:1:1 (the ratio of blue light is high and the color temperature is high), then the ratio after the white balance is 1:2:2. That is, the circuit magnification ratio is adjusted to significantly reduce the proportion of blue and to increase the proportions of green and red. As such, in the image of the scene to be adjusted captured by the circuit after white balance adjustment, proportions of blue, green, and red are the same. That is, if the white to be adjusted is slightly blue, then the white balance adjustment will change the normal ratio to attenuate the amplification effect of the blue circuit and increase the proportions of green and red to make the resulting image still white.

After the captured image undergoes the white balance process, color proportions of the captured image will be changed. The RGB values of the corresponding skin color model will be inconsistent with the RGB values of the original image, which is prone to cause error in the recognition process.

The embodiments of the present disclosure provides two methods for eliminating the influence of white balance on the RGB values in the skin color model, as described in detail below.

In the first embodiment, the white balance function of the camera is turned off. Before capturing an image, the white balance function in the camera is turned off. In general, there is an option in the camera to turn the white balance on and/or off.

In the second embodiment, white balance inverse transformation is performed on the RGB values in the skin color model:

If the white balance function of the camera cannot be turned off, the obtained RGB values may also be inverse transformed according to the inverse algorithm of the white balance algorithm. Specifically, the RGB values obtained by the camera are brought into the white balance algorithm formula as shown below:

$$\{R', G', B'\} = f\{R, G, B\}$$

Inverse algorithm of the above formula f can obtain the RGB values in the skin color model without white balance process.

For example, the conventional white balance algorithm uses a gray-world algorithm. Specifically, $$Rav = \sum_{i=1}^{N} \sum_{j=1}^{M} R_{ij}$$

$$Gav = \sum_{i=1}^{N} \sum_{j=1}^{M} G_{ij}$$

$$Bav = \sum_{i=1}^{N} \sum_{j=1}^{M} B_{ij}$$

$$\begin{cases} GainR = \max(Rav, Gav, Bav)/Rav \\ GainG = \max(Rav, Gav, Bav)/Gav \\ GainB = \max(Rav, Gav, Bav)/Bav \end{cases}$$

$$R' = \begin{cases} R^*GainR \rightarrow R^*GainR < 255 \\ 255 \rightarrow R^*GainR > 255 \end{cases}$$

$$G' = \begin{cases} G^*GainG \rightarrow G^*GainG < 255 \\ 255 \rightarrow G^*GainG > 255 \end{cases}$$

$$B' = \begin{cases} B^*GainB \rightarrow B^*GainB < 255 \\ 255 \rightarrow B^*GainB > 255 \end{cases}$$

$$\begin{cases} R' = R^*GainR \\ G' = G^*GainG \\ B' = B^*GainB \end{cases}$$

Inverse algorithm of the gray world algorithm is:

$$\begin{cases} R = R'/GainR \\ G = G'/GainG \\ B = B'/GainB \end{cases}$$

GainR, GainG, and GainB are color temperature data that come with the captured image, which can be found through specifications of the device.

Correspondingly, the skin color model is converted into a color luminance separation color space, and a skin color segmentation process is performed on the captured image based on the color luminance separation color space.

During acquisition of the image, the camera will process light exposure of the image based on illumination condition at the scene. If the exposure time is short, illumination during the acquisition of image is strong. If the exposure time is too long, illumination during the acquisition of image is weak. As long as there is exposure during acquisition of the image, the range of saturation in the skin model is adjusted.

The saturation refers to color purity. The higher the purity, the more vivid the appearance. The lower the purity, the dimmer the appearance. Saturation indicates the color depth or vividness of the light, depending on the content of white light in the color. The higher the content of the white light, the lower the content of the color light and the lower the color saturation, and vice versa. The value of saturation is expressed as a percentage, between 0 and 100%. Pure white light has a color saturation of 0, and pure color light has a saturation of 100%.

Therefore, in order to ensure that the range of the saturation in the skin model matches the range of the saturation of the original image as much as possible, the range of the saturation of the collected image needs to be adjusted.

For example, when the skin color model is converted into a color luminance separation color space with an HSV (Hue, Saturation, Value) color model, it is necessary to adjust the range of the saturation in the HSV (Hue, Saturation, Value) color model according to the exposure time.

The HSV color model is:

$$\begin{cases} H = H \\ S = k(t_{IOS})^*S \\ V = V \end{cases}$$

Wherein S represents saturation, H represents hue, K is a saturation conversion factor, and $t_{IOS}$ is thin exposure time.

Figure 4:
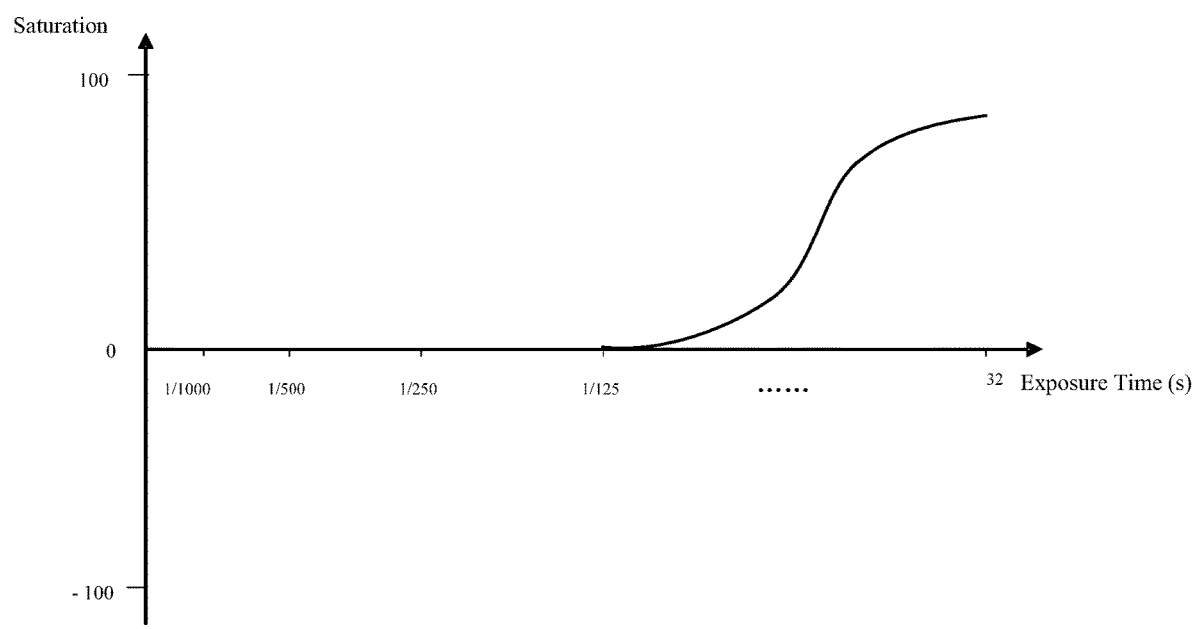
FIG. 4 is a graph of a relationship between exposure time and saturation according to an embodiment of the present disclosure.

Based on the exposure time when the image is captured, a saturation corresponding to the exposure time can be obtained by using the mapping curve, as shown in FIG. 4.

Figure 5:
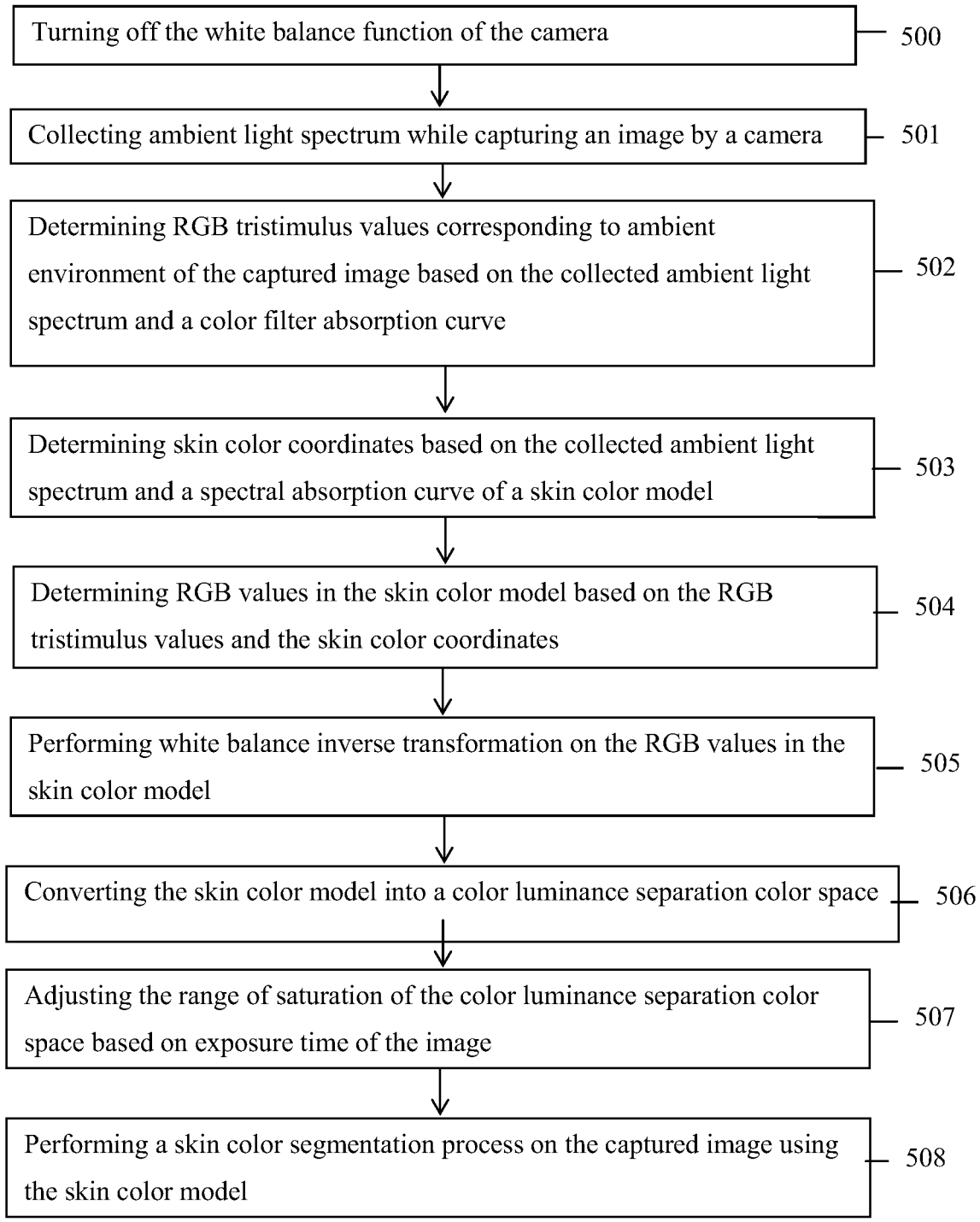
FIG. 5 is a flow chart of a complete method for processing an image according to an embodiment of the present disclosure.

An embodiment of the present disclosure provides a complete method of processing an image, as shown in FIG. 5.

In step 500, the white balance function of the camera is turned off.

In step 501, the ambient light spectrum is collected while the image is captured by the camera.

In step 502, RGB tristimulus values corresponding to the ambient environment of the collected image are determined based on the collected ambient light spectrum and a preset color filter absorption curve.

In step 503, the skin color coordinates are determined based on the collected ambient light spectrum and a spectral absorption curve of a preset skin color model.

In step 504, RGB values in the skin color model are determined based on the RGB tristimulus values and the skin color coordinates.

In step 505, white balance inverse transformation is performed on the RGB values in the skin color model.

In step 506, the skin color model is converted into a color luminance separation color space.

In step 507, the range of saturation of the color luminance separation color space is adjusted based on exposure time of the collected image.

Both step 500 and step 505 function to eliminate the effect of white balance on RGB values in the skin color model, so that only one of the steps needs to be performed. Order of steps 502 and 503 in embodiments of the present disclosure is not limited thereto. Therefore, step 502 may be performed first, and then step 503 may be performed. Alternatively, step 503 may be performed first, and then step 502 may be performed.

The method for processing an image in an embodiment of the present disclosure further provides a readable storage medium of a computing device, that is, the content is not lost after power is turned off. The storage medium stores a software program including program code. When the program code runs on the computing device, the software program may be read by one or more processors and executed to implement the image processing method according to any one of the above embodiments of the present disclosure.

Based on the same inventive concept, an embodiment of the present disclosure provides an image processing apparatus. Since the method corresponding to the apparatus is for performing image processing according to an embodiment of the present disclosure and the principle of solving the problem by the apparatus is similar to the method, implementation of the apparatus may refer to implementation of the method as described above, and details of the implementation of the apparatus are not described herein again.

Figure 6:
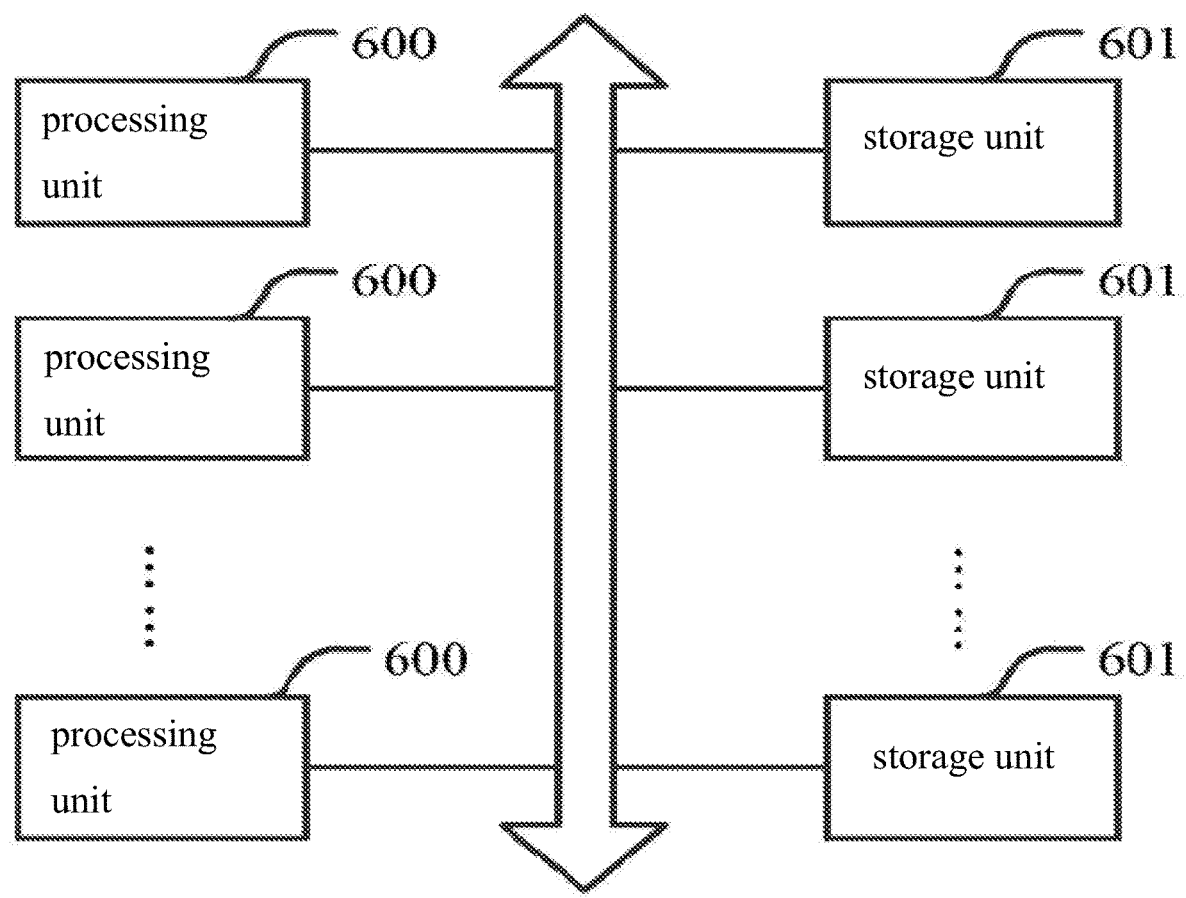
FIG. 6 is a structural diagram of an apparatus for processing an image according to an embodiment of the present disclosure.

An embodiment of the present disclosure provides an image processing apparatus. As shown in FIG. 6, the apparatus includes at least one processing unit 600 and at least one storage unit 601. The storage unit 601 stores the program code. When the program code is executed by the processing unit 600, the processing unit 600 performs the following processes:

The ambient light spectrum is collected while the image is captured by a camera. Then, RGB tristimulus values corresponding to the ambient environment of the collected image is determined based on the collected ambient light spectrum and a preset color filter absorption curve; the skin color coordinates are determined based on the collected ambient light spectrum and a spectral absorption curve of a preset skin color model; and RGB values in the skin color model are determined based on the RGB tristimulus values and the skin color coordinates. Then, the captured image is subjected to skin color segmentation process using the skin color model.

In one embodiment, the processing unit 600 is specifically configured to determine RGB tristimulus values corresponding to the ambient environment of the collected image based on the collected ambient light spectrum and a preset color filter absorption curve.

In one embodiment, the processing unit 600 is specifically configured to determine tristimulus values based on the collected ambient light spectrum and a spectral absorption curve of a preset skin color model and to determine skin color coordinates based on the tristimulus values.

In one embodiment, the processing unit 600 is specifically configured to turn off the white balance function of the camera before collecting the ambient light spectrum while capturing the image by the camera. Alternatively, the processing unit 600 is specifically configured to perform white-balanced inverse transformation on the RGB values in the skin color model after the RGB values in the skin color model are determined based on the RGB tristimulus values and the skin color coordinates and before the skin color segmentation process is performed on the captured image using the skin color model.

In one embodiment, the processing unit 600 is specifically configured to convert the skin color model into a color luminance separation color space, and to perform skin color segmentation process on the captured image based on the color luminance separation color space.

Figure 7:
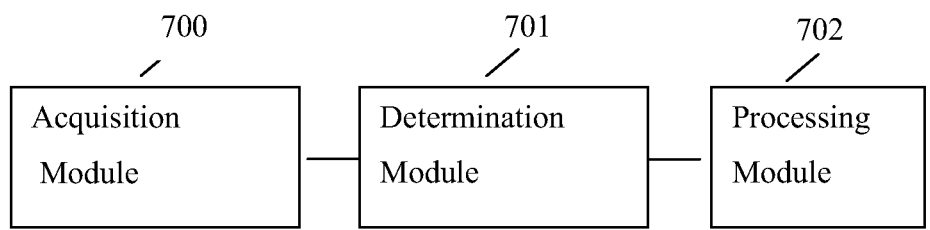
FIG. 7 is a structural diagram of an apparatus for processing an image according to an embodiment of the present disclosure.

An embodiment of the present disclosure provides an apparatus for processing an image. As shown in FIG. 7, the apparatus for processing an image includes an acquisition module 700, a determination module 701, and a processing module 702. The acquisition module 700 is configured to collect an ambient light spectrum while capturing an image through a camera.

The determination module 701 is configured to determine RGB tristimulus values corresponding to the ambient environment in which the image is captured based on the collected ambient light spectrum and a preset color filter absorption curve, to determine the skin color coordinates based on the collected ambient light spectrum and a preset spectral absorption curve of the skin color model, and to determine the RGB values in the skin color model based on the RGB tristimulus values and the skin color coordinates.

The processing module 702 is configured to perform a skin color segmentation process on the captured image using the skin color model.

In one embodiment, the determination module 701 is configured to determine RGB tristimulus values corresponding to the ambient environment in which the image is captured based on the collected ambient light spectrum and a preset color filter absorption curve.

In one embodiment, the determination module 701 is configured to determine tristimulus values based on the collected ambient light spectrum and a preset spectral absorption curve of the skin color model and to determine skin color coordinates based on the tristimulus values.

In one embodiment, the processing module 702 is configured to turn off the white balance function of the camera before collecting the ambient light spectrum while capturing the image by a camera. Alternatively, the processing module 702 is specifically configured to perform white-balanced inverse transformation on the RGB values in the skin color model after the RGB values in the skin color model are determined based on the RGB data color coordinates and the skin color coordinates and before the skin color segmentation process is performed on the captured image using the skin color model.

In one embodiment, the processing module 702 is configured to convert the skin color model into a color luminance separation color space, and to perform a skin color segmentation process on the captured image based on the color luminance separation color space.

The present application is described above with reference to the block diagrams and/or flowcharts illustrating methods, apparatus (systems), and/or computer program products according to embodiments of the present disclosure. One block of the block diagrams and/or flowchart illustration and/or combinations of blocks of the block diagrams and/or flowchart illustrations can be implemented by computer program instructions. These computer program instructions may be provided to a general purpose computer, a special purpose computer processor, and/or other programmable data processing apparatus to produce a machine so that the instructions are executed by the computer processor and/or other programmable data processing apparatus to create a method of implementing the functions/acts specified in the block diagrams and/or flowchart blocks according to embodiments of the present disclosure.

Accordingly, the present application may also be implemented in hardware and/or software (including firmware, resident software, microcode, etc.). In one embodiment, this application may take the form of a computer program product on a computer-usable or computer-readable storage medium. The computer program product has computer-usable or computer-readable program codes embodied in the medium to be used by or in connection with the instruction execution system. In the context of the present application, a computer-usable or computer-readable medium may be any medium that can contain, store, communicate, transport, or transfer the program for use by an instruction execution system, apparatus, or device, or in connection with an instruction execution system, apparatus or device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing an image, comprising:
   collecting an ambient light spectrum while capturing the image;
   determining RGB tristimulus values corresponding to ambient environment of the captured image based on the collected ambient light spectrum and a color filter absorption curve;
   determining skin color coordinates based on the collected ambient light spectrum and a spectral absorption curve of a skin color model; and
   determining RGB values in the skin color model based on the RGB tristimulus values and the skin color coordinates.

2. The method according to claim 1, further comprising:
   performing a skin color segmentation process on the captured image using the skin color model.

3. The method according to claim 2, further comprising:
   turning off white balance function of the camera before collecting the ambient light spectrum while capturing the image by the camera; or
   performing white balance inverse transformation on the RGB values in the skin color model after the RGB values in the skin color model are determined based on the RGB tristimulus values and the skin color coordinates and before the skin color segmentation process is performed on the captured image using the skin color model.

4. The method according to claim 2, wherein performing the skin color segmentation process on the captured image using the skin color model comprises:
   converting the skin color model into a color luminance separation color space; and
   performing the skin color segmentation process on the captured image based on the color luminance separation color space.

5. The method according to claim 4, wherein performing the skin color segmentation process on the captured image using the skin color model comprises adjusting a range of saturation of the color luminance separation color space based on exposure time of the collected image.

6. The method according to claim 1, wherein collecting the ambient light spectrum while capturing the image by the camera comprises collecting the ambient light spectrum in a range of a wavelength of 380 nm to 780 nm with an interval of 1 nm or 5 nm.

7. The method according to claim 1, wherein determining the skin color coordinates based on the collected ambient light spectrum and the spectral absorption curve of the skin color model comprises:
   determining tristimulus values based on the collected ambient light spectrum and the spectral absorption curve of the preset skin color model; and
   determining the skin color coordinates based on the tristimulus values.

8. An apparatus for processing an image, comprising:
   at least one processing unit and at least one storage unit,
   wherein the storage unit is configured to store a program code, and
   the program code is configured to be executed by the processing unit to perform steps of collecting an ambient light spectrum while capturing the image by a camera; determining RGB tristimulus values corresponding to ambient environment of the captured image based on the collected ambient light spectrum and a color filter absorption curve; determining skin color coordinates based on the collected ambient light spectrum and a spectral absorption curve of a skin color model; determining RGB values in the skin color model based on the RGB tristimulus values and the skin color coordinates; and performing a skin color segmentation process on the captured image using the skin color model.

9. The apparatus according to claim 8, wherein the processing unit is configured to determine RGB tristimulus values corresponding to ambient environment of the captured image based on the collected ambient light spectrum and the color filter absorption curve.

10. The apparatus according to claim 8, wherein the processing unit is configured to determine tristimulus values based on the collected ambient light spectrum and the spectral absorption curve of the skin color model and determine the skin color coordinates based on the tristimulus values.

11. The apparatus according to claim 8, wherein the processing unit is configured to turn off white balance function of the camera before collecting the ambient light spectrum while capturing the image by the camera; or to perform white balance inverse transformation on the RGB values in the skin color model after the RGB values in the skin color model are determined based on the RGB tristimulus values and the skin color coordinates and before the skin color segmentation process is performed on the captured image using the skin color model.

12. The apparatus according to claim 8, wherein the processing unit is configured to convert the skin color model into a color luminance separation color space; and to perform the skin color segmentation process on the captured image based on the color luminance separation color space.

13. An apparatus for processing an image, comprising:
   an acquisition module, a determination module, and a processing module,
   wherein the acquisition module is configured to collect an ambient light spectrum while capturing the image by a camera;
   the determination module is configured to determine RGB tristimulus values corresponding to ambient environment of the captured image based on the collected ambient light spectrum and a color filter absorption curve, to determine skin color coordinates based on the collected ambient light spectrum and a spectral absorption curve of a skin color model, and to determine RGB values in the skin color model based on RGB data color coordinates and the skin color coordinates; and the processing module is configured to perform a skin color segmentation process on the captured image using the skin color model.

\* \* \* \* \*